United States Patent
Cheung et al.

(10) Patent No.: US 12,524,566 B2
(45) Date of Patent: Jan. 13, 2026

(54) RESTRICTED FULLY PRIVATE CONJUNCTIVE DATABASE QUERY FOR PROTECTION OF USER PRIVACY AND IDENTITY

(71) Applicant: KONINKLIJKE PHILIPS N.V., Eindhoven (NL)

(72) Inventors: Yee Him Cheung, Boston, MA (US); Alex Ryan Mankovich, Somerville, MA (US)

(73) Assignee: Koninklijke Philips N.V., Eindhoven (NL)

( * ) Notice: Subject to any disclaimer, the term of this patent is extended or adjusted under 35 U.S.C. 154(b) by 493 days.

(21) Appl. No.: 17/636,919

(22) PCT Filed: Aug. 21, 2020

(86) PCT No.: PCT/EP2020/073476
§ 371 (c)(1),
(2) Date: Feb. 21, 2022

(87) PCT Pub. No.: WO2021/037708
PCT Pub. Date: Mar. 4, 2021

(65) Prior Publication Data
US 2022/0382904 A1 Dec. 1, 2022

Related U.S. Application Data

(60) Provisional application No. 62/891,718, filed on Aug. 26, 2019.

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/602* (2013.01); *G16H 10/60* (2018.01);
(Continued)

(58) Field of Classification Search
CPC ... G06F 21/6245; G06F 21/602; G16H 10/60; H04L 9/008; H04L 9/0825; H04L 9/3026; H04L 9/3247; H04L 2209/50
See application file for complete search history.

(56) References Cited

U.S. PATENT DOCUMENTS

| | | | | |
|---|---|---|---|---|
| 7,742,594 B1 * | 6/2010 | Loc | ........................ | H04L 9/0631 713/168 |
| 2003/0185395 A1 * | 10/2003 | Lee | ........................ | G06F 21/10 713/176 |

(Continued)

OTHER PUBLICATIONS

Private Database Queries Using Somewhat Homomorphic Encryption Dan Boneh Craig Gentryy Shai Haleviy Frank Wangz David J. Wu (Year: 2013).*

(Continued)

*Primary Examiner* — Sheweye Gelagay
*Assistant Examiner* — Thomas A Carnes

(57) ABSTRACT

A method of securely accessing a database with sensitive data, such as the clinical information of patients, by a client in a privacy-preserving manner, including: communicating with the server to obtain tags for specific attribute-value pairs when the client is authorized to make a query; imposing a tag quota per client and restricting tag generation to authorized query terms with valid digital signatures from a third-party authority; storing the tags and their associated query terms in confidence for future queries; sending a combination of tags that define the terms of a conjunctive query over a secure channel to a proxy; receiving from the proxy encrypted coefficients of a polynomial whose roots are indices to the query results; decrypting the encrypted (Continued)

coefficients in a first protocol with the server; calculating the roots of the polynomial based upon the decrypted coefficients and discarding any superfluous roots; obtaining the encrypted records associated with the calculated roots from the proxy; and decrypting the encrypted records in a second protocol with the server.

14 Claims, 4 Drawing Sheets

(51) Int. Cl.
    *G16H 10/60*     (2018.01)
    *H04L 9/00*     (2022.01)
    *H04L 9/08*     (2006.01)
    *H04L 9/30*     (2006.01)
    *H04L 9/32*     (2006.01)
(52) U.S. Cl.
    CPC ............ *H04L 9/008* (2013.01); *H04L 9/0825* (2013.01); *H04L 9/3026* (2013.01); *H04L 9/3247* (2013.01); *H04L 2209/50* (2013.01)

(56) References Cited

U.S. PATENT DOCUMENTS

| | | | | |
|---|---|---|---|---|
| 2012/0030244 | A1* | 2/2012 | John | G06F 16/958 707/E17.143 |
| 2013/0197922 | A1* | 8/2013 | Vesto | G16H 70/20 705/2 |
| 2014/0298009 | A1* | 10/2014 | Hattori | H04L 9/3073 713/155 |
| 2015/0039885 | A1* | 2/2015 | Cash | H04L 9/0894 713/165 |
| 2016/0132692 | A1* | 5/2016 | Kerschbaum | G06F 21/6227 713/189 |
| 2018/0189502 | A1* | 7/2018 | Kumar | H04L 9/0863 |
| 2019/0273617 | A1* | 9/2019 | Maher | H04L 9/085 |
| 2020/0351081 | A1* | 11/2020 | Hirano | H04L 9/0869 |
| 2023/0318809 | A1* | 10/2023 | Fox-Epstein | H04L 9/0894 713/171 |

OTHER PUBLICATIONS

Boneh, D. et al., "Private Database Queries Using Somewhat Homomorphic Encryption". Stamford University. ACNS 2013, LNCS 7954, pp. 102-118, 2013.

Boneh et al "Private Database Queries Using Somewhat Homomorphic Encryption" Advances in Databases and Information Systems, Jun. 25, 2013 p. 102-118.

Wang et al "Secure Fine-Grained Encrypted Keyword Search for E-Healthcare Cloud" IEEE Transactions On Dependable and Secure Computing May 13, 2019.

De Cristofaro et al "Efficient Techniques for Privacy Preserving Sharing of Sensitive Information" Int. Conf. On Trust and Trustworthy Computing, 2011.

International Search Report and Written Opinion from PCT/EP2020/073476 mailed Nov. 16, 2020.

* cited by examiner

RESTRICTED FULLY PRIVATE CONJUNCTIVE DATABASE QUERY FOR PROTECTION OF USER PRIVACY AND IDENTITY

CROSS REFERENCE TO RELATED APPLICATIONS

This application is a U.S. national phase application of International Application No. PCT/EP2020/073476 filed on Aug. 21, 2020, which claims the benefit of U.S. Application Ser. No. 62/891,718 filed on Aug. 26, 2019 and are incorporated herein by reference.

TECHNICAL FIELD

Various exemplary embodiments disclosed herein relate generally to restricted fully private conjunctive database query for protection of user privacy and identity.

BACKGROUND

Genetics knowledge warehouses—databases including structured multi-institutional patient records and accompanying genomic aberrations—can serve as a rich resource of information for research and clinical decision support by linking patient phenotypes and clinical outcomes to, among other features, their underlying genotypes. In cases of rare disease, an input query of patient features and genotype into a sufficiently large warehouse can help inform a diagnosis. When no approved therapy can be identified, patients can be easily notified of existing clinical trials. When no clinical trials are available, clinicians may engage pharmaceutical companies for new studies.

The Beacon Project from Global Alliance for Genomics & Health (GA4GH) is an open standard for genomics data discovery, originally serving as a federated database which aims to answer questions such as "Do you have information about allele 'A' at position 938294 on chromosome 9?". This feature is useful for clinicians searching for a second case that could inform therapy decisions for their patient. Recently, the Beacon Project announced additional features including tiered metadata access levels—public, registered, and controlled—where the highest level of access can view not just whether an allele exists in a database, but also metadata informing the exact nucleotide change, reference genome version, and associated annotations (such as pathogenicity). This model, while useful in its own right, does not allow users to query based on genotype combinations and/or metadata, nor does it allow for incorporation of data outside the stated scope (such as a collection of patient phenotypes). This is partly due to the many privacy challenges facing a framework with such qualities.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of securely accessing a patient database by a client, including: communicating with the server to transform attribute-value pairs into tags; obtaining tags associated with the attribute-value pairs over a secure communication channel; sending a combination of the generated tags that define the terms in a conjunctive query to a proxy over a secure communication channel; receiving from the proxy the encrypted coefficients of a polynomial whose roots are indices to the records satisfying the query terms; decrypting the encrypted coefficients in a first protocol with the server; calculating the roots of the polynomial based upon the decrypted coefficients and discarding any superfluous roots; obtaining the encrypted records associated with the calculated roots; and decrypting the encrypted records in a second protocol with the server.

Various embodiments are described, wherein the tags are hashed values generated by transforming the attribute-value pairs through the cooperation between the client and the server using a method that includes authorized oblivious pseudorandom function evaluation.

Various embodiments are described, wherein the tags are only generated when one or more of the following criteria are met: (i) the total number of tags issued for the client is within a predefined limit according to the access right specified in the public key certificate of the client, and (ii) each of the query terms has a valid digital signature from a third-party authority.

Various embodiments are described, wherein decrypting the encrypted coefficients in a first protocol with the server includes oblivious decryption.

Various embodiments are described, wherein decrypting the encrypted records in a second protocol with the server includes oblivious decryption.

Various embodiments are described, further including limiting the number of tags that could be issued for a client, and storing tags and their associated query terms in confidence at the client for future queries.

Various embodiments are described, wherein further including setting an upper limit on the total number of tags allowed for a client according to the access right specified in the client's public key certificate and keeping a record of the total number of tags that have been issued for the client at the server.

Various embodiments are described, further including creating and logging into an user account on server using the client's authorized public key certificate and the associated private key and establishing a secure communication channel with the server.

Various embodiments are described, further including storing the tags and their associated query terms in confidence for future queries; and establishing a secure communication channel with the proxy.

Further various embodiments relate to a method of setting up, by a server, secure access of a patient database by a client, including: receiving a query tag request including an authorized public key certificate of the client; verifying the digital signature of the client; setting up a secure communication channel with the client upon successful verification of the digital signature; communicating with the server to transform attribute-value pairs into tags; and storing the authorized tags in confidence with the clients account.

Various embodiments are described, wherein communicating with the server to transform attribute-value pairs into tags further includes performing an oblivious pseudorandom function (OPRF) evaluation with the client.

Various embodiments are described, further including keeping track of the total number of tags that have been issued for the client.

Various embodiments are described, wherein verifying the digital signature of the client further includes generating and sending a random message to the client.

Further various embodiments relate to a client system configured to securely access a patient database using a proxy system and a server, including: a memory configured to store data and computer instructions; and a processor configured to: communicate with the server to transform attribute-value pairs into tags; obtain tags associated with the attribute-value pairs over a secure communication channel; send a combination of the generated tags that define the terms in a conjunctive query to a proxy over a secure communication channel; receive from the proxy the encrypted coefficients of a polynomial whose roots are indices to the records satisfying the query terms; decrypt the encrypted coefficients in a first protocol with the server; calculate the roots of the polynomial based upon the decrypted coefficients and discard any superfluous roots; obtain the encrypted records associated with the calculated roots; and decrypt the encrypted records in a second protocol with the server.

Various embodiments are described, wherein the tags are hashed values generated by transforming the attribute-value pairs through the cooperation between the client and the server using a method that includes authorized oblivious pseudorandom function evaluation.

Various embodiments are described, wherein the tags are only generated when one or more of the following criteria are met: (i) the total number of tags issued for the client is within a predefined limit according to the access right specified in the public key certificate of the client, and (ii) each of the query terms has a valid digital signature from a third-party authority.

Various embodiments are described, wherein decrypting the encrypted coefficients in a first protocol with the server includes oblivious decryption.

Various embodiments are described, wherein decrypting the encrypted records in a second protocol with the server includes oblivious decryption.

Various embodiments are described, wherein the processor is further configured to limit the number of tags that could be issued for a client, and store tags and their associated query terms in confidence at the client for future queries.

Various embodiments are described, wherein the processor is further configured to set an upper limit on the total number of tags allowed for a client according to the access right specified in the client's public key certificate and keep a record of the total number of tags that have been issued for the client at the server.

Various embodiments are described, wherein the processor is further configured to create and log into an user account on server using the client's authorized public key certificate and the associated private key and establishing a secure communication channel with the server.

Various embodiments are described, wherein the processor is further configured to store the tags and their associated query terms in confidence for future queries and establish a secure communication channel with the proxy.

Further various embodiments relate to a server configured to set up secure access of a patient database by a client, including: a memory configured to store data and computer instructions; and a processor configured to: receive a query tag request including an authorized public key certificate of the client; verify the digital signature of the client; set up a secure communication channel with the client upon successful verification of the digital signature; communicate with the server to transform attribute-value pairs into tags; and store the authorized tags in confidence with the clients account.

Various embodiments are described, wherein communicating with the server to transform attribute-value pairs into tags further includes performing an oblivious pseudorandom function (OPRF) evaluation with the client.

Various embodiments are described, wherein the processor is further configured to keep track of the total number of tags that have been issued for the client.

Various embodiments are described, wherein verifying the digital signature of the client further includes generating and sending a random message to the client.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
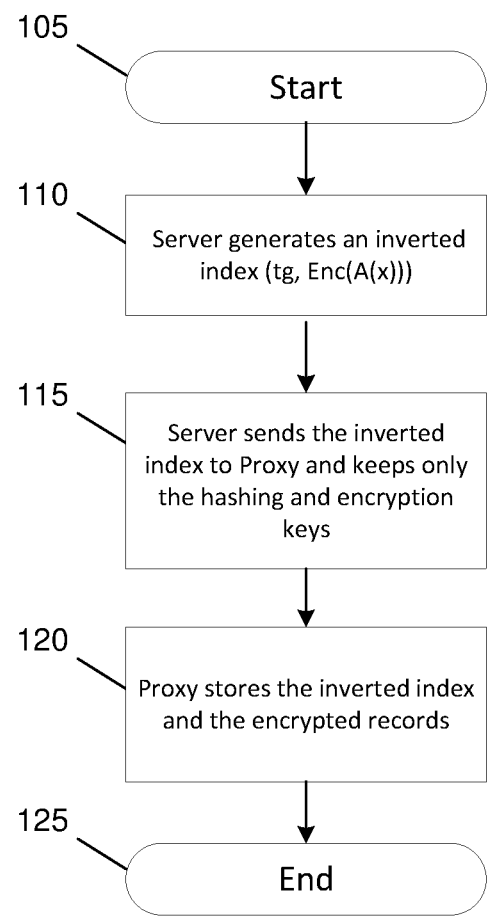
FIG. 1 illustrates a database set up method and the addition of new samples to the database.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Critical to the ability to utilize a genetics knowledge warehouse for rare diseases (and more common ailments) is the ability to submit queries relevant to each patient's condition and genotype. Equally important is the ability to maintain the privacy of patients residing in the knowledge warehouse as well as the patient data included in the query. Existing search engines housing purely genomic data (e.g., the Beacon Network) have relatively simple measures (e.g., data aggregation, information budgeting, secured access) to mitigate re-identification in part because re-identification is difficult with exclusively genomic data. However, for scenarios requiring knowledge of patient features, such as phenotypes, diagnoses, demographics, and other facets of the patient journey, the bar for privacy is necessarily set higher. Because the combination of genotype and phenotype data make it much easier to identify a specific patient, and hence harder to protect the privacy of such a patient. Any solution that promises to make use of combined clinical and genomic data must address this privacy dilemma. Embodiments will be described herein that satisfy these concerns using a series of methods for database initialization and augmentation, fully private query construction, and client-targeted query restrictions.

Genetics knowledge warehouses are also a helpful tool for creating and optimizing clinical pathways. Clinical pathways are an important tool for oncology care—they represent a standard set of treatment guidelines for a given patient history. Clinical pathways are generally created and improved with data residing in individual institutions due to data sharing/ownership hurdles. However, a privacy-preserving mechanism would likely enable cross-institution genetics knowledge warehouses and provide additional data as a means to optimize existing clinical pathways.

Embodiment of a system using a set of security protocols will now be described that improve secure access to patient data. First a three-party protocol for fully private conjunctive database query will be described. This three party protocol is described in more detail in Boneh D., Gentry C., Halevi S., Wang F., Wu D. J. (2013) Private Database Queries Using Somewhat Homomorphic Encryption. In: Jacobson M., Locasto M., Mohassel P., Safavi-Naini R. (eds) Applied Cryptography and Network Security. ACNS 2013. Lecture Notes in Computer Science, vol 7954. Springer, Berlin, Heidelberg, which is hereby incorporated by reference for all purposes as if included herein.

The protocol includes three parties: a server; a proxy; and a client. The server prepares an encrypted inverted index and sends the index to a proxy during a pre-processing step, and after that the server keeps only the keys used to create this inverted index, including some hashing keys and the secret key for a somewhat homomorphic encryption (SWHE) scheme.

For every attribute-value pair (a, v) in the database, the inverted index contains a record (tg, Enc(A(x))), where tg is a tag, computed as tg=Hash("a=v"), and A(x) is a polynomial whose roots are exactly the record indices r that contain this attribute-value pair.

The proxy stores an inverted index and encrypted records for the database. This associated each tag tg with a specific data record in the database. The basic assumption is that there is no collusion between the server and the proxy.

The client has a public key certificate and the associated private key, and the client obtains query tags by performing oblivious pseudorandom function (OPRF) evaluation with the server. The client stores the query tags and their associated query terms in confidence and initiates a conjunctive query by sending a selected set of the tags to the proxy over a secure communication channel so that the query remains private.

To impose restrictions on the query terms permissible for an authorized yet anonymous client, each client is only allowed to obtain up to a maximum number of query tags depending on the access right specified in the public key certificate of the client. During the tag generation process, the server keeps a record of the total number of tags that have already been issued and stop generating any more tags once the maximum number is reached for the client. The client then stores the tags issued by the server and their associated query terms in confidence for future queries. As a result, a client will only be able to make queries using a limited number of query terms. Duplicate tag requests for the same query terms would result in wastage of tag quota and should therefore be avoided by the client.

In the stricter setting where the client is authorized to query only certain attribute-value pairs that are individually digitally signed by a third-party authority (e.g., a laboratory that generates clinical reports with information on the phenotypes and genomic aberrations of patients), the client obtains the tags by performing oblivious PRF evaluation with the server where the evaluation succeeds only if the client has a valid signature. The corresponding authorized oblivious PRF protocol is described in De Cristofaro, Emiliano, Yanbin Lu, and Gene Tsudik, "Efficient techniques for privacy-preserving sharing of sensitive information", International Conference on Trust and Trustworthy Computing, Springer, Berlin, Heidelberg, 2011. At the end of the protocol, if the signature was valid, the client obtains the tag while the server gains no new information. If the signature is invalid, both the client and the server gain no new information.

FIG. 1 illustrates a database set up method and the addition of new samples to the database. To add new samples to the database, the server generates an inverted index record for each searchable attribute-value pair ($a_i$, $v_{ij}$) of the new samples that includes a tag 110 and generates an encrypted polynomial function 110. The tag may be defined as tg=Hash("$a_i$=$v_{ij}$"). The encrypted polynomial function may defined as Enc($A_{ij}$(x)) with roots that are exactly indices to records that contain this attribute-value pair. With Enc( ) being a SWHE function, and if the attribute-value pair already exists in the database, Enc($A_{ij}$(x)) may either be generated afresh or updated by incorporating the indices of the new matching samples as additional roots to the encrypted polynomial of the existing samples. In the context of clinical and genomic databases, the attribute-value pairs may include any demographic/clinical data, e.g., "HDL=High", or genomic aberrations, e.g. "BRAF V600E=True". Next, the server sends the inverted index to Proxy and keeps only the hashing and encryption keys 115. Then, the proxy stores the inverted index and the encrypted records 120, and the process ends 125.

Figure 2:
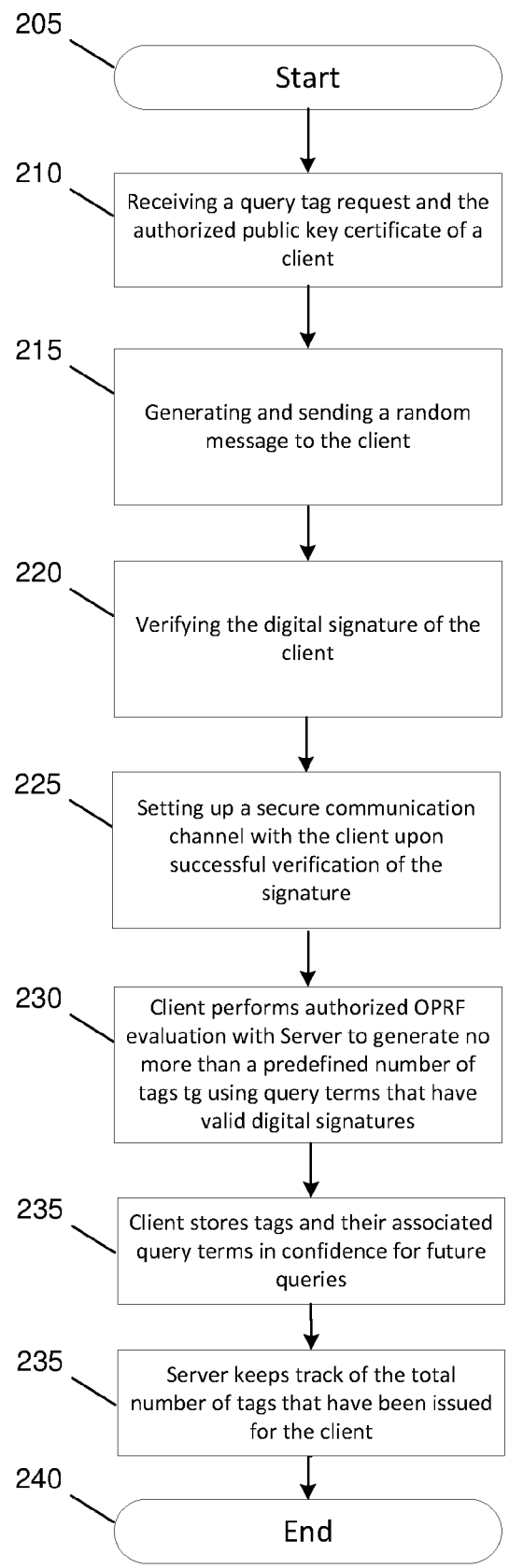
FIG. 2 illustrates a method of setting up a limited number of permissible query terms for an authorized anonymous client.

FIG. 2 illustrates a method of requesting a limited number of permissible query tags for authorized anonymous clients. To prevent a malicious client from abusing the private query mechanism by performing extensive searches to gain access to data for unauthorized purposes, query-level access control will be imposed to restrict access to the minimum-required operations and data. This may be accomplished through a query tag request process, in which an anonymous client with an authorized public key certificate access its account at the server 210 by signing with its private key a random message generated by the server 215. Upon receiving the digital signature, the server verifies the signature using the public key of the client, and if the digital signature is correct 220, a secured communication channel may be established with a private session key shared between the server and the client 225. The client can now obtain tags corresponding to a list of attribute-value pairs by performing oblivious pseudorandom function (OPRF) evaluation with the server 230. The attribute-value pairs are transformed into tags tg=PRFs (a=v) 230, where PRF is a pseudo-random function such as a hash function and S is a key associated with the PRF. In the stricter setting where the client is authorized to query only certain attribute-value pairs that are individually digitally signed by a third-party authority, the client obtains the tags by performing oblivious PRF evaluation with the server where the evaluation succeeds only if the client has a valid signature. The client then stores the generated tags and their associated query terms in confidence for future queries 235. The server keeps a record of the total number of tags that have been issued to the client and imposes an upper limit on the total number of permissible query terms for each client 235. The process can be repeated until the number of tags has reached the maximum allowed for the client. The maximum number of tags can be set according to the access right of the client specified in the authorized public key certificate.

Figure 3:
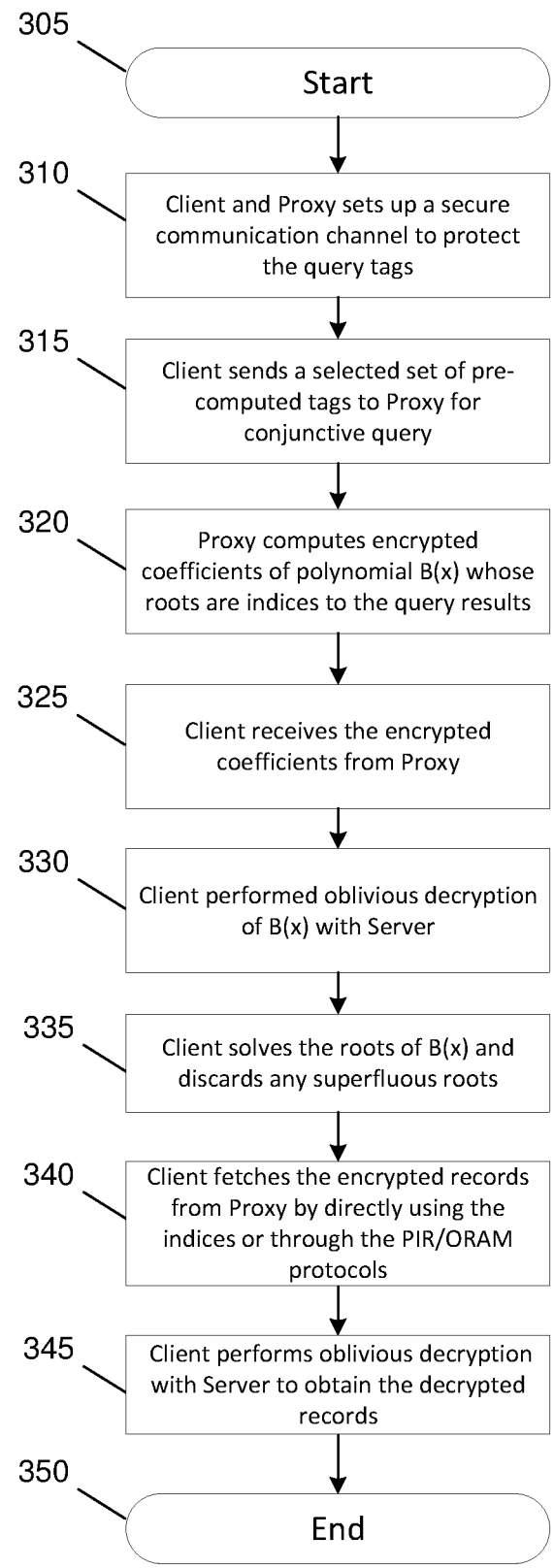
FIG. 3 illustrates a method for a fully private query with query term restrictions specific to each client.

FIG. 3 illustrates a method for a fully private query with query term restrictions specific to each client. Assuming the client query "SELECT*FROM database WHERE $a_1=v_1$ AND . . . AND $a_n=v_n$" and the tags $tg_k$ of the individual attribute-value pairs have been obtained from the server as described in the tag request process, the steps involved in the fully private query process are as follows:

1. The client and the proxy sets up a secure communication channel to protect the query tags 310.

2. The client sends the tags $tg_k$ to the proxy for conjunctive query 315.

3. The proxy gets the encrypted coefficients of polynomials $A_1(x)$, $A_n(x)$, whose roots are the record indices corresponding to tags $tg_1, \ldots, tg_n$ for attribute-value pairs $a_1=v_1, \ldots, a_n=v_n$. The proxy then computes the encrypted coefficients of $B(x)=\Sigma^n_{i=1} A_i(x)R_i(x)$, where $R_i(x)$ are random polynomials, using additive homomorphism and sends the encrypted B(x) to the client. The roots of B(x) are the indices to records that satisfy the conjunctive query condition "$a_1=v_1$ AND . . . AND $a_n=v_n$" 320.

4. The client and server engage in another protocol to perform oblivious decryption of B(x) encrypted under the server's private key 325. After this step, the client knows B(x) and the server knows nothing 325 and 330.

5. The client solves B (x) to find its roots, which contain the indices to the records that satisfy the query conditions 335. Due to the random polynomials R(x) introduced in Step 3, some of the roots are superfluous. However, because a large-enough space was used, it is most likely that these superfluous roots are identified as invalid and discarded.

6. With the indices of the matching records, the client can either send the indices directly or uses private information retrieval (PIR)/oblivious RAM (ORAM) to fetch the encrypted records 340, and then performs oblivious decryption with the server to obtain the decrypted records 345.

A few examples of applying the embodiments described herein will now be given.

In the first example a clinician queries an existing database for a registered patient. An automated (hospital-initiated, third-party-application-initiated) or manual (clinician-initiated) query may be submitted to an existing genetics knowledge warehouse for an existing, registered pediatrics patient. The clinician initially suspected a diagnosis of Shprintzen-Goldberg syndrome due to the presented phenotypes. However, the patient tested negative for mutations in the SKI gene known to be causative. The query includes the following set of patient features:

Demographics: age, sex
Phenotypes: presented symptoms indicating Sphrintzen-Goldberg syndrome
Genotype: negative for mutation in SKI gene Because the genetics knowledge warehouse (database) has been setup prior to this scenario, database setup is not required. The fully private query is then performed with restrictions as follows:

1. The clinician-side client signs into his account with his public key certificate.

2. The client communicates with the server to obtain OPRF-evaluated tags of the attribute-value pairs in the query through a secure channel. The tags are only generated for query terms with valid digital signatures from a third-party authority. The server keeps a record of the total number of tags issued to the client and imposes an upper limit according to the access right of the client specified in his public key certificate.

3. After receiving the tags, the client sends them to the proxy.

4. The proxy retrieves the encrypted coefficients of a polynomial, whose roots are indices to records satisfying the query condition, and sends them to the client.

5. The client communicates with the server to perform oblivious decryption of the encrypted coefficients.

6. The client solves the coefficients, obtaining the record indices.

7. The client retrieves the encrypted records using the record indices and communicates with the server to perform oblivious decryption to obtain the final, unencrypted records.

Using the unencrypted records, another case is found that shares many phenotypic features with the patient, where a diagnosis was made of Kosaki overgrowth syndrome, with a confirmed causative mutation in the PDGFRB gene. Based on this information, the clinician orders a genetic test for mutations in PDGFRB. It is found that the patient indeed has a novel mutation in PDGFRB and treatment decisions are subsequently rendered based on this new diagnosis.

In a second example a clinical pathway optimization process is illustrated. A renowned cancer center that licenses clinical pathways has negotiated with several customers—other healthcare institutions that pay for such a license—to engage in a special licensing model that reduces direct licensing costs incurred from using the clinical pathways in exchange for their participation in a shared clinical knowledgebase for partnering institutions. The cancer center would like to use the clinical knowledgebase to evaluate how a certain pathway is performing and identify areas of improvement, while keeping their proprietary clinical pathways confidential. The cancer center (in this case the client) is already registered and so has a set of tags corresponding to pre-determined permissible query terms based on each clinical pathway. Using a combination of the query tags, representing part or all of the pathways of interest, the cancer center is able to assess records in the knowledgebase for aggregate outcome data. Using this data the cancer center concludes that in this pathway there is no measurable benefit to patients with aggressive disease receiving a particular systemic therapy and opts to change the pathway to reflect this new knowledge.

In a third example, a public figure is diagnosed with major depression and severe insomnia, and has been taking currently available prescription drugs, but the symptoms are getting worse. He wants to find a clinical trial that might improve his conditions, but is worried that unprotected online searches might leak his mental health problem to the media. He has learned of a clinical trial database that uses the restricted fully private query technology and decides to give it a try. He got both an anonymized digital certificate and an electronic clinical report from the hospital that includes information on his diagnosis and symptoms ("diagnosis='major depression'", "symptom='insomnia'"), and personal background ("gender='male'", "ethnicity'='caucasian'", "age='20-30'", etc.). Each of the key items on the report comes with a digital signature of the hospital, permitting each to be used as a query term. He uses the anonymized digital certificate to create an account to access the clinical trial database, and then submits the relevant query terms together with their digital signatures to the database server. Through the query process, none of his sensitive personal data is exposed to the database server or the network. He finds a matching clinical trial that uses an investigational digital therapeutic to offer cognitive behavioral therapy for insomnia and sleep restriction algorithms to reduce the severity of insomnia and symptoms of depression. He enrolls in the clinical trial and after a few months of treatment his conditions are significantly improved.

Figure 4:
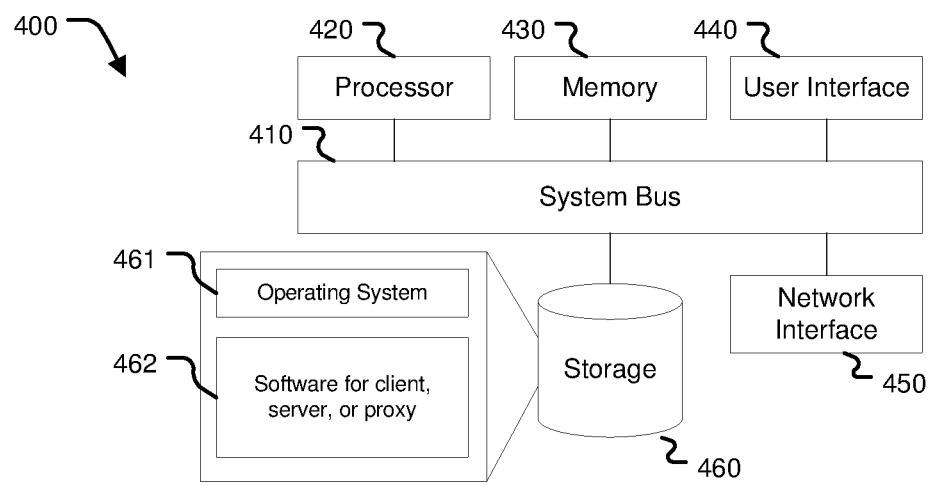
FIG. 4 illustrates an exemplary hardware diagram for implementing the client, server, or proxy described above.

FIG. 4 illustrates an exemplary hardware diagram 400 for implementing the client, server, or proxy described above. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random-access memory (SRAM), dynamic RAM (DRAM), flash memory, read only memory (ROM), or other similar memory devices.

The user interface 440 may include one or more devices for enabling communication with a user. For example, the user interface 440 may include a display, a touch interface, a mouse, and/or a keyboard for receiving user commands. In some embodiments, the user interface 440 may include a command line interface or graphical user interface that may be presented to a remote terminal via the network interface 450.

The network interface 450 may include one or more devices for enabling communication with other hardware devices. For example, the network interface 450 may include a network interface card (NIC) configured to communicate according to the Ethernet protocol or other communications protocols, including wireless protocols. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system 461 for controlling various basic operations of the hardware 400. The storage 461 may store instructions 462 for carrying out the functions of the server, client, or proxy as described above.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

The embodiments described herein solve the technological problem of increasing the security and patient privacy when query is made in a patient database that contains patient information. For example, when a patient database includes both genome and phenome data, it becomes much easier to identify specific patients. Accordingly, the embodiments described above only allow a user to query the database for authorized attribute-value pairs having specific values. As a result, clients are limited what data they can gain access to, which increases the security and privacy of the patient database.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of securely accessing a patient database by a client, comprising:
communicating with a server to transform attribute-value pairs into tags;
obtaining tags associated with the attribute-value pairs over a secure communication channel,
wherein the tags are hashed values generated by transforming the attribute-value pairs through the cooperation between the client and the server using a method that includes authorized oblivious pseudorandom function evaluation, and
wherein the tags are only obtained when one or more of the following criteria are met: (i) the total number of tags issued for the client is within a predefined limit according to the access right specified in a public key certificate of the client, and (ii) each of one or more query terms has a valid digital signature from a third-party authority;

sending a combination of the obtained tags that define the one or more query terms in a conjunctive query to a proxy over the secure communication channel, wherein the combination of the obtained tags indicates one or more potential clinical pathways;

receiving, from the proxy, encrypted coefficients of a polynomial whose roots are indices to records satisfying the one or more query terms;

decrypting the encrypted coefficients in a first protocol with the server to generate decrypted coefficients;

calculating the roots of the polynomial based upon the decrypted coefficients and discarding any superfluous roots;

obtaining encrypted records associated with the calculated roots;

decrypting the encrypted records in a second protocol with the server to generate decrypted records; and modifying a clinical pathway based on the decrypted records.

2. The method of claim 1, wherein decrypting the encrypted coefficients in a first protocol with the server includes oblivious decryption.

3. The method of claim 1, wherein decrypting the encrypted records in a second protocol with the server includes oblivious decryption.

4. The method of claim 1, further comprising limiting the number of tags that could be issued for a client, and storing tags and their associated query terms in confidence at the client for future queries.

5. The method of claim 3, further comprising setting an upper limit on the total number of tags allowed for a client according to the access right specified in a client's public key certificate and keeping a record of the total number of tags that have been issued for the client at the server.

6. The method of claim 1, further comprising creating and logging into an user account on server using a client's authorized public key certificate and the associated private key and establishing the secure communication channel with the server.

7. The method of claim 1, further comprising storing the tags and their associated query terms in confidence for future queries; and establishing the secure communication channel with the proxy.

8. A client system configured to securely access a patient database using a proxy system and a server, comprising:
a memory configured to store data and computer instructions; and
a processor configured to:
communicate with the server to transform attribute-value pairs into tags;
obtain tags associated with the attribute-value pairs over a secure communication channel,
wherein the tags are hashed values generated by transforming the attribute-value pairs through the cooperation between the client and the server using a method that includes authorized oblivious pseudorandom function evaluation, and
wherein the tags are only obtained when one or more of the following criteria are met: (i) the total number of tags issued for the client is within a predefined limit according to the access right specified in a public key certificate of the client, and (ii) each of the one or more query terms has a valid digital signature from a third-party authority;

send a combination of the obtained tags that define the one or more query terms in a conjunctive query to a proxy over the secure communication channel, wherein the combination of the obtained tags indicates one or more potential clinical pathways;

receive, from the proxy, encrypted coefficients of a polynomial whose roots are indices to records satisfying the one or more query terms;

decrypt the encrypted coefficients in a first protocol with the server to generate decrypted coefficients;

calculate the roots of the polynomial based upon the decrypted coefficients and discard any superfluous roots;

obtain encrypted records associated with the calculated roots;

decrypt the encrypted records in a second protocol with the server to generate decrypted records; and modifying a clinical pathway based on the decrypted records.

9. The system of claim 8, wherein decrypting the encrypted coefficients in a first protocol with the server includes oblivious decryption.

10. The system of claim 8, wherein decrypting the encrypted records in a second protocol with the server includes oblivious decryption.

11. The system of claim 8, wherein the processor is further configured to limit the number of tags that could be issued for a client, and store tags and their associated query terms in confidence at the client for future queries.

12. The system of claim 11, wherein the processor is further configured to set an upper limit on the total number of tags allowed for a client according to the access right specified in a client's public key certificate and keep a record of the total number of tags that have been issued for the client at the server.

13. The system of claim 8, wherein the processor is further configured to create and log into an user account on server using the client's authorized public key certificate and the associated private key and establishing the secure communication channel with the server.

14. The system of claim 8, wherein the processor is further configured to store the tags and their associated query terms in confidence for future queries and establish the secure communication channel with the proxy.

* * * * *